United States Patent Office 2,705,728
Patented Apr. 5, 1955

2,705,728

PROCESS FOR THE PREPARATION OF UNSATURATED ALICYCLIC 2-METHYLBUTANAL COMPOUNDS

Hans Herloff Inhoffen, Braunschweig, Germany, assignor to Hoffmann-La Roche Inc., Nutley, N. J., a corporation of New Jersey No Drawing. Application May 17, 1952,
Serial No. 288,533

Claims priority, application Germany May 21, 1951

7 Claims. (Cl. 260—598)

The present invention relates to the manufacture of unsaturated aldehydes of the formula $C_{12}H_{18}O$ and the homologues thereof. The products of the present process are derivatives, with two double bonds, of 2-methyl-4-cyclohexyl-butanal-(1), the nucleus of which carries 1-3 methyl substituents.

According to the present invention, such compounds may be obtained by reacting, by an alkali metal or Grignard reaction, o-methylated cyclohexanone compounds of the general formula

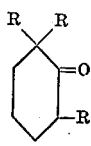

wherein one of the radicals R is methyl, while the others are methyl or hydrogen, with ethers of 1-hydroxy-2-methylbutyne compounds of the general formula $$HC{\equiv}C-X-OR'$$

wherein X stands for the group

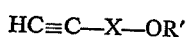

or

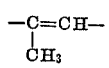

and R' represents a hydrocarbon radical, and, in any desired sequence, on the one hand partially hydrogenating at the triple bond the condensation product formed of the general formula

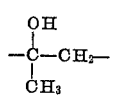

and on the other hand dehydrating the same, and treating the compound thus obtained with acid.

The first step of the new process consists in condensing o-methylated cyclohexanone compounds with ethers of 1-hydroxy-2-methyl-butene-(1)-yne-(3) or 1-ethers of 1,2-dihydroxy-2-methyl-butyne-(3), respectively. The condensation may be effected by an alkali metal condensation or a Grignard reaction. The condensation by way of the lithium compounds proves to be particularly suitable. Thus, the lithium compound of the acetylene component may be prepared by reaction with lithium phenyl in boiling ether. If a hydroxyl group is present, the same is first protected by lithium. The condensation with the o-methylated cyclohexanone is advantageously effected in ethereal solution. The hydrolysis of the salts of the condensation product formed may be achieved by means of a saturated ammonium chloride solution. A condensation product of the formula

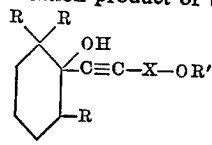

wherein X represents

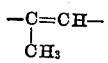

or

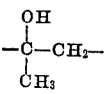

and R' means a hydrocarbon radical, is obtained, thus particularly a 1-ether of 1-hydroxy-2-methyl-4-[1'-hydroxy-mono-(or di- or tri-)-methyl-cyclohexyl]-butene-(1)-yne-(3) or 1,2-dihydroxy-2-methyl-4-[1'-hydroxy-mono-(or di- or tri-)-methyl-cyclohexyl]-butyne-(3).

These condensation products can be purified by distillation, chromatography or separation of the solvent. The ethers of 1-hydroxy-2-methyl-4-[1'-hydroxy-mono-(or di- or tri-)-methyl-cyclohexyl]-butene-(1)-yne-(3) show an absorption maximum in the ultraviolet spectrum at about 230 m$\mu$ and, when determined according to Zerewitinoff, values corresponding to one active H-atom. The 1-ethers of 1,2-dihydroxy-2-methyl-4-[1'-hydroxy-mono-(or di- or tri-)-methyl-cyclohexyl]-butyne-(3) show a maximal absorption at about 210 m$\mu$. The determination according to Zerewitinoff gives values for two active H-atoms.

The transformation of these condensation products into the butanal compound with two double bonds is effected, on the one hand, by first partially hydrogenating the former at the triple bond, and, on the other hand, subjecting the compound obtained to dehydration, and then treating the compound obtained with acid.

The partial hydrogenation of the triple bond is effected, suitably after purification, by employing the usual means, for instance by catalytic hydrogenation in the presence of palladium catalysts the activity of which has been reduced by the addition of lead and quinoline. The introduction of hydrogen is interrupted after 1 mol of hydrogen has been taken up.

The dehydration may for instance be effected by heating the compound with phosphorus oxychloride in toluene and pyridine or by conducting the evaporated compound over aluminum phosphate at a temperature higher than 300° C. or by heating the compound with organic acids in inert solvents, such as toluene or petroleum ether (boiling point 80–110° C.). An advantageous process consists in boiling with p-toluene sulfonic acid in toluene. 1 or 2 mols of water are thereby split off depending on whether the compound to be dehydrated contains 1 or 2 hydroxyl groups. In given cases, allyl rearrangement may thereby take place, for instance, if 1-methoxy-2-hydroxy-2-methyl-4-(1'-hydroxy-2'-methyl-cyclohexyl)-butene-(3) is heated with p-toluene sulfonic acid in toluene.

The product of the partial hydrogenation and dehydration corresponds to the general formula

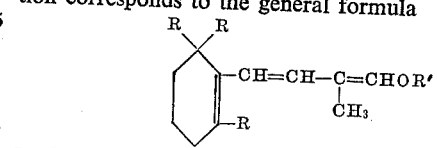

In the event of the dehydration being effected in strongly acid medium, the reaction of the new process changes in such a way that, by allyl rearrangement, the hydroxy group in 1'-position migrates from the nucleus into the side chain. A hemiacetal of the general formula

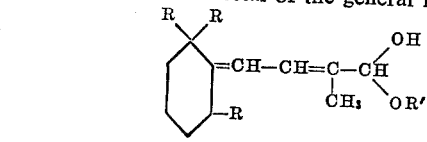

will probably be formed thereby through double allyl rearrangement of the said hydroxyl group.

The last step of the new progress consists in the treatment with acid. For such purpose, the intermediate products of the partial hydrogenation and dehydration are for instance dissolved in 20 times their quantity of alcohol, the same quantity of 20 per cent sulfuric acid is added, and the mixture is allowed to stand for 12 hours at room temperature. The aldehyde group is thereby formed from the etherified hydroxyl group through cleavage of the enol ether or, as the case may be, the hemiacetal, respectively.

The cleavage of the enol ether is preferably carried out in a separate reaction step. In carrying out the above described modification of the new process, in the course of which a hemiacetal is formed by double allyl rearrangement, the acid treatment can be effected together with the dehydration. For such purpose, the employment of strongly acid dehydration means, such as for instance boiling with p-toluene sulfonic acid in toluene, is suitable.

By the above described process, the 2-methyl butanal compound of the formula $C_{12}H_{18}O$ carrying two double bonds is obtained or, according to the cyclic starting material elected, the two next higher homologues thereof, respectively, are formed.

The isolation and purification is for instance achieved by separation between solvents, distillation or chromatography. The constitution of the compound obtained is not known; the following constitution formulae may come into consideration:

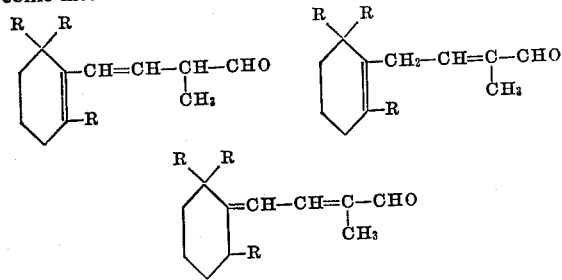

The products of the present process are valuable intermediates for the synthesis of physiologically active compounds; in particular, the aldehyde of the formula

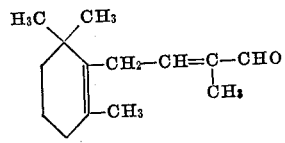

is the preferred starting material for the synthesis of vitamin A.

According to the present invention, the aldehyde mentioned may be obtained advantageously by condensing trimethylcyclohexanone-(1) by means of a lithium reaction with 1-methoxy-2-hydroxy-2-methyl-butyne-(3), partially hydrogenating at the triple bond the 1-methoxy-2-hydroxy-2-methyl-4-[1'-hydroxy-2',6',6'-trimethyl-cyclohexyl]-butyne(3) formed and dehydrating the 1-methoxy-2-hydroxy-2-methyl-4-[1'-hydroxy-2',6',6'-trimethylcyclohexyl]-butene-(3) obtained and treating the dehydration product with an acid.

Example 1

26.7 of g. 1-methoxy-2-hydroxy-2-methylbutyne-(3) are dissolved in 60 cc. of absolute ether and, in the course of 30 minutes, added dropwise, while stirring, to 500 cc. of a lithium phenyl solution containing 9.1 mg. of lithium per cc. The reaction mixture is then heated to boiling for 30 minutes, whereby a white precipitate falls out. A solution of 23.7 g. of 2-methyl-cyclohexanone-(1) in 60 cc. of absolute ether is slowly added dropwise to the suspension of the lithium salt of 1-methoxy-2-hydroxy-2-methylbutyne-(3) formed. The precipitate thereby dissolves. After standing for 12 hours at room temperature, the mixture is heated to boiling for 30 minutes, cooled down and the metal-organic compound is decomposed with an ice-cold, saturated ammonium chloride solution. The ether solution is then washed neutral with water and dried over sodium sulfate. After distilling the ether in vacuo, there remains a yellow oil which is taken up in 500 cc. of petroleum ether. The petroleum ether solution is shaken out twice with 100 cc. each of 70 per cent methanol. The methanolic extracts are washed twice with 50 cc. each of petroleum ether, then diluted with 500 cc. of water and shaken out five times with 75 cc. each of ether. The united ether extracts are washed with water, dried with sodium sulfate and evaporated in vacuo. The residue (12 g.) is distilled in high vacuo and yields a first running of boiling point 0.001 mm. Hg 110–120° C. (viscous, yellowish oil, active H=1.2 mol) and a main fraction of boiling point 0.001 mm. Hg 140–160° C. (almost solid, yellow oil, active H=1.8 mol).

3 g. of this main fraction chiefly consisting of 1-methoxy-2-hydroxy-2-methyl-4-(1'-hydroxy-2'-methylcyclohexyl)-butyne-(3) are dissolved in 50 cc. of alcohol and hydrogenated in the presence of 1 g. of 4 per cent palladium charcoal. After 290 cc. of hydrogen (96 per cent of the calculated quantity) have been taken up, the hydrogenation is interrupted, the catalyst is filtered off and the alcohol evaporated in vacuo. 2.8 g. of 1-methoxy-2-hydroxy-2-methyl-4-(1'-hydroxy-2'-methylcyclohexyl)-butene(3) are obtained in the form of a viscous, light-yellow oil showing only terminal absorption in the ultra-violet spectrum.

2.5 g. of this oil, without purification, are dissolved in 300 cc. of absolute toluene and heated to boiling in a flask equipped with an ascending tube, while introducing nitrogen. 200 mg. of p-toluene-sulfonic acid are then added. After boiling for 10 minutes, the solution now of red-yellow color is quickly cooled down, washed twice with sodium bicarbonate solution and water, the toluene solution is dried and the solvent is distilled off in vacuo. The residual reddish oil (2.1 g.) is taken up in 30 cc. of petroleum ether and chromatographed onto an aluminum oxide column (activity II according to Brockmann). A side-product is eluted with petroleum ether (400 mg. of a light-yellow oil with λ max. of 250 mμ), whereas the desired compound forms a red-yellow zone in the upper third of the column. This main zone is eluted with petroleum ether to which 5 per cent of acetone have been added. 1.5 g. of the 2-methylbutanal compound with two double bonds are obtained from the eluate in the form of a yellow oil. Ultraviolet maximum: λ=296 mμ; its 2,4-dinitrophenylhydrazone forms red needles of melting point 205° C.

The formation of the 2-methylbutanal compound with two double bonds which probably stand in conjugation to the carbonyl group, presumably follows a course illustrated by the following formulae

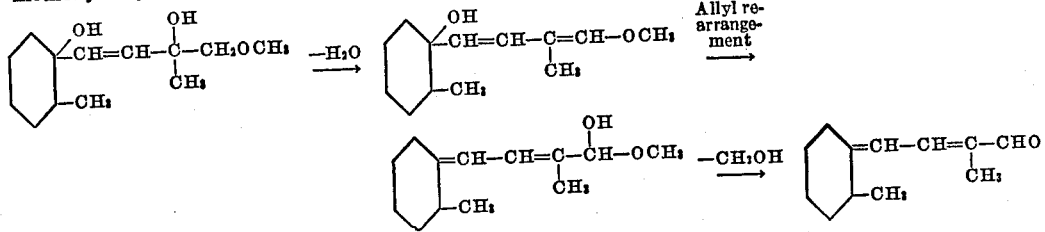

Example 2

2.1 g. of 1-methoxy-2-hydroxy-2-methylbutyne-(3) are dissolved in 10 cc. of absolute ether and slowly added dropwise, while stirring, to 51 cc. of a lithium phenyl solution containing 7.14 mg. of lithium per cc. The mixture is then heated to boiling for 30 minutes, whereby a white precipitate falls out. A solution of 1.7 g. of 2,2,6-trimethylcyclohexanone-(1) in 10 cc. of absolute ether is slowly added dropwise to the suspension of the lithium salt of 1-methoxy-2-hydroxy-2-methyl-butyne-(3) thus obtained. The precipitate thereby dissolves. After standing for 12 hours at room temperature, the solution is heated to boiling for 30 minutes, cooled down and the metal-organic compound is decomposed with an ice-cold, saturated ammonium chloride solution.

The ether solution is then washed neutral with water and dried over sodium sulfate. After distilling the solvent in vacuo, there remain 3.87 g. of a yellow oil which are taken up in 25 cc. of petroleum ether. This petroleum ether solution is shaken out three times with 10 cc. each of 70 per cent methanol. The methanolic extracts are washed twice with 5 cc. each of petroleum ether, then diluted with 40 cc. of water and shaken out four times with 5 cc. each of ether. The united ether extracts are washed several times with water, then dried with sodium sulfate and evaporated in vacuo. The residue (1.9 g.) is distilled in high vacuo and yields a small first running of boiling point 0.001 mm. Hg up to 120° C. and a main fraction (1.42 g.) of boiling point 0.001 mm. Hg 130–138° C. (yellow, viscous oil, active H=1.7 mol).

1.38 g. of this main fraction chiefly consisting of 1-methoxy-2-hydroxy-2-methyl-4-(1'-hydroxy-2',6',6'-trimethylcyclohexyl)-butyne-(3) are dissolved in 20 cc. of alcohol and hydrogenated in the presence of 0.5 g. of 4 per cent palladium charcoal. After 120 cc. of hydrogen (98 per cent of the calculated quantity) have been taken up, the hydrogenation is interrupted, the catalyst is filtered off and the alcohol evaporated in vacuo. 1.24 g. of 1-methoxy-2-hydroxy-2-methyl-4-(1'-hydroxy-2',6',6'-trimethyl - cyclohexyl)-butene-(3) in the form of a viscous, light-yellow oil are obtained.

1.24 g. of this oil, without purification, are dissolved in 30 cc. of absolute toluene and heated to boiling in a flask equipped with an ascending tube, while introducing nitrogen. 105 mg. of p-toluene sulfonic acid are then added. After boiling for 10 minutes, the solution now of red-yellow color is quickly cooled down, washed twice with sodium bicarbonate solution and water, the toluene solution is dried over sodium sulfate and the solvent is distilled off in vacuo. The residual reddish oil (1.04 g.) is taken up in 10 cc. of petroleum ether and chromatographed at an aluminum oxide column (activity II according to Brockmann).

A side product (ultraviolet maximum 238 and 267 mμ) is washed out with petroleum ether. The column itself shows several zones, namely first two yellow zones of a more strongly adhering side product (ultraviolet maximum 270 mμ), then the brown-yellow main zone and finally again a yellow zone of a more weakly adhering side product (ultraviolet maximum 267 and 360 mμ). The zones are cut out of the column and eluted with petroleum ether to which 5 per cent acetone has been added. 330 mg. of the 2-methylbutanal compound with two double bonds (ultraviolet maximum 294 mμ and ultraviolet minimum 245 mμ) are thereby obtained from the eluate of the brown-yellow main zone in the form of a yellow oil.

With a view to further characterizing this compound, the oil obtained can be reacted in alcoholic solution with the same quantity of 2,4-dinitrophenylhydrazine by heating on a waterbath in the presence of hydrochloric acid. The fine red crystals thereby formed, after several recrystallizations from absolute alcohol, melt at 167–178° C. with decomposition. (Ultraviolet maximum 402 mμ.)

*Example 3*

A phenyl lithium solution containing 4.95 g. of lithium is slowly added dropwise, while stirring, to a solution of 36.7 g. of 1-methoxy-2-hydroxy-2-methylbutyne-(3) in 150 cc. of absolute ether. The resulting white suspension of the lithium salt of 1-methoxy-2-hydroxy-3-methyl-butyne-(3) is subsequently kept boiling for 30 minutes. After cooling, a solution of 40 g. of 2,2,6-trimethyl-cyclohexanone-(1) in 150 cc. of absolute ether is slowly added dropwise, while stirring, whereby the precipitate gradually dissolves. After standing for 12 hours at room temperature, the mixture is heated to boiling for 30 minutes and the metal-organic compound formed is then decomposed with an ice-cold saturated ammonium chloride solution, while cooling with ice. The ether solution is then washed neutral with water and dried over sodium sulfate. After distilling the solvent in vacuo, 83.2 g. of a yellow oil remain behind which are taken up in 200 cc. of petroleum ether. This petroleum ether solution is shaken out three times with 90 cc. each of aqueous methanol (220 cc. of methanol and 48 cc. of water). The methanolic extracts are united and washed three times with 30 cc. each of petroleum ether saturated with methanol. The methanol solution is then diluted with 500 cc. of water and extracted four times with 150 cc. of ether. The united ether solutions are shaken out several times with water, then dried over sodium sulfate and calcium chloride and boiled down in vacuo. The residue (69.1 g.) is distilled in high vacuo and yields 39.2 g. of 1-methoxy - 2 - hydroxy-2-methyl-4-(1' - hydroxy - 2',6',6'-trimethylcyclohexyl)-butyne-(3) of boiling point 0.01 mm. Hg 129° C. The colorless viscous oil shows only terminal absorption in the ultraviolet spectrum (active H=1.88 mol).

39.2 g. of 1-methoxy-2-hydroxy-2-methyl-4-(1'-hydroxy-2',6',6'-trimethyl-cyclohexyl)-butyne-(3) are dissolved in 200 cc. of methanol and hydrogenated in the presence of 3 g. of 4 per cent palladium charcoal. After 97 per cent of the calculated quantity of hydrogen (duration of the hydrogenation about 45 minutes) have been taken up, the hydrogenation is interrupted, the catalyst is filtered off and the methyl alcohol is evaporated in vacuo. 38.1 g. of 1-methoxy-2-hydroxy-2-methyl-4-(1'-hydroxy-2',6',6'-trimethyl-cyclohexyl)-butene-(3) are obtained.

37.8 g. of 1-methoxy-2-hydroxy-2-methyl-4-(1'-hydroxy-2',6',6'-trimethylcyclohexyl)-butene-(3) are dissolved in 800 cc. of xylene and heated to 140° C. in an oil bath. 2.3 g. of p-toluene sulfonic acid are then added. The resulting water distills off azeotropically. The solution assumes a yellow color. After 6 minutes further 750 mg. of p-toluene sulfonic acid are added. The solution turns reddish after three minutes. The reaction mixture is then cooled down quickly, washed neutral with sodium bicarbonate solution and water and the solvent is evaporated at a bath temperature of 42° C. in the vacuum of an oil pump. 37.1 g. of an orange-colored oil with an ultraviolet absorption maximum at 294 mμ (ε=3,800) are obtained as residue.

For the purpose of purification, this oil is dissolved in low-boiling petroleum ether and absorbed onto an aluminum oxide column (activity II according to Brockmann) having a length of 50 cm. and a diameter of 3 cm. First a red oil is eluted with petroleum ether which absorbs in a range of 220–240 mμ and shows a blue Carr-Price reaction. As soon as the first portions of aldehyde, which are recognizable by a yellow Carr-Price reaction, are passing through the elution is continued with an addition of 10 per cent benzene. If the aldehyde portion is collected in 10 equal fractions, the united fractions 7 and 8 yield a residue of 1.6 g. of aldehyde with an extinction at 294 mμ of 17,400 and all the remaining united fractions yield a residue of 6.9 g. with an extinction of 14,200.

The further characterization of the aldehyde is effected according to the indications in Example 2.

I claim:
1. A process which comprises dehydrating a compound selected from the group consisting of those having the formulae

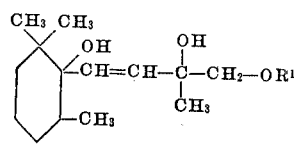

and

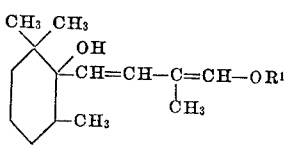

wherein $R^1$ is a lower alkyl radical, and subjecting the dehydrated product to acid cleavage to produce an unsaturated aldehyde having the same carbon skeleton as the starting material but having two double bonds and having an ultraviolet maximum at about 294 mμ and an ultraviolet minimum at about 245 mμ.

2. A process which comprises heating 1-methoxy-2-hydroxy - 2 - methyl - 4 - [1' - hydroxy - 2',6',6'-trimethylhexyl]-butene-(3) in strongly acid medium to produce an unsaturated aldehyde having the same carbon skeleton as the starting material but having two double bonds and having an ultraviolet maximum at about 294 mμ and an ultraviolet minimum at about 245mμ.

3. A compound selected from the group consisting of those having the formulae

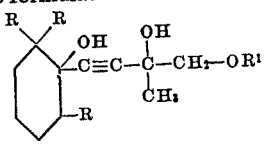

and

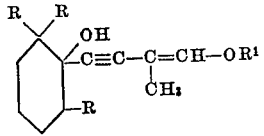

wherein R is selected from the group consisting of hydrogen and methyl, at least one R being methyl, and $R^1$ is a lower alkyl radical.

4. 1-lower alkoxy-2-hydroxy-2-methyl-4-[1′-hydroxy-2′,6′,6′-trimethylcyclohexyl]-butyne-(3)

5. A compound selected from the group consisting of those having the formulae

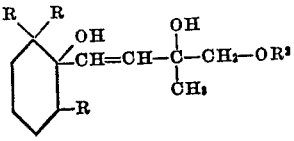

and wherein R is selected from the group consisting of hydrogen and methyl, at least one R being methyl, and $R^1$ is a lower alkyl radical.

6. 1-lower alkoxy-2-hydroxy-2-methyl-4-[1′-hydroxy-2′,6′,6′-trimethylcyclohexyl]-butene-(3).

7. 1 - methoxy - 2 - hydroxy - 2 - methyl - 4 - [1′ - hydroxy-2′,6′,6′-trimethylcyclohexyl]-butene-(3).

References Cited in the file of this patent

UNITED STATES PATENTS

| | | |
|---|---|---|
| 2,591,811 | Heilbron | Apr. 8, 1952 |
| 2,614,124 | Evans | Oct. 14, 1952 |